United States Patent [19]

Leube et al.

[11] Patent Number: 5,251,197
[45] Date of Patent: Oct. 5, 1993

[54] POLARIZATION DEPENDENT WRITING AND ERASING PROCESS FOR ORGANIC OPTICAL MEDIA

[75] Inventors: Hartmann F. Leube, Summit; Leroy McKenzie, Newark, both of N.J.

[73] Assignee: Hoechst Celanses Corp., Somerville, N.J.

[21] Appl. No.: 835,645

[22] Filed: Feb. 13, 1992

[51] Int. Cl.⁵ .................................................. G11B 7/00
[52] U.S. Cl. ...................................................... 369/110
[58] Field of Search ............................ 369/110; 359/45

[56] References Cited

U.S. PATENT DOCUMENTS

| | | | |
|---|---|---|---|
| 3,871,745 | 3/1975 | Waku et al. | 365/121 |
| 3,988,056 | 10/1976 | Hareng et al. | 359/45 |
| 4,297,417 | 10/1981 | Wu | 430/346 |
| 4,753,861 | 6/1988 | Tsou | 430/270 |
| 4,886,718 | 12/1989 | Eich et al. | 359/96 |
| 5,024,784 | 6/1991 | Eich et al. | 359/45 |

OTHER PUBLICATIONS

"Photoreaction in mesogenic media", Stumpe et al. *Makromol. Chem., Rapid Commun.* 12, pp. 81–87.
"An Infrared Spectroscopic Study of Photo-induced Reorientation in Dye Containing Liquid-Crystalline polymers", Weismer et al., *Liquid Crystals*, vol. II, No. 2, pp. 251–267, 1992.

*Primary Examiner*—Bruce C. Anderson
*Attorney, Agent, or Firm*—Michael W. Ferrell

[57] ABSTRACT

A writing/erasing method for use in connection with homotropic organic optical media is disclosed and claimed. The method includes writing on a thin film with light of a first linear polarity to induce birefringence along the direction of an optical axis of the film's initial state followed by erasing the film with light of a second linear polarity. The first and second linear polarities are angularly offset with respect to one another, preferably by 90 degrees.

17 Claims, 1 Drawing Sheet

POLARIZATION DEPENDENT WRITING AND ERASING PROCESS FOR ORGANIC OPTICAL MEDIA

CROSS REFERENCE TO RELATED APPLICATIONS

The subject matter of this patent is related to that of U.S. Ser. No. 07/812,596, filed Dec. 23, 1991 and U.S. Ser. No. 07/812,553, filed Dec. 23, 1991.

TECHNICAL FIELD

The present invention relates generally to a writing and erasing method for use in connection with organic optical media, and specifically relates to a method of erasing media marked with light of a first linear polarization by exposure to light of a second linear polarization, wherein the first and second polarizations are angularly offset with respect to each other.

BACKGROUND OF INVENTION

Organic media for optical recording is known to those of skill in the art. Generally speaking, such media must undergo a detectable change in optical properties when irradiated by a beam of light in preselected areas so that bits of information can be recorded in useful form. The change in optical properties may be a change in reflectivity or refractive index and may be primarily photochemical or thermal in nature or some combination thereof. In any case, a large optical contrast between recorded and unrecorded areas is oftentimes desirable so that differences in optical properties are readily detected without the need for highly discriminating and expensive collateral apparatus.

Organic recording media are typically more suitable for write-once, read-many (WORM) systems because existing organic media tend to undergo irreversible change in optical properties when marked with a laser, for example. The change is irreversible in the sense that the surface cannot, practically speaking, be restored to its original state after marking. It has been reported in the literature that the homogeneity of certain anisotropic films may be reversibly changed by irradiating the surface with light parallel and then with light perpendicular to the optical axis of the film's initial state. Stumpe, J. et al "Photoreaction in Mesogenic Media", Makromol. Chem. Rapid Commun. 12, 81–87 (1991).

SUMMARY OF INVENTION

It has been found that organic thin film media incorporating a liquid crystal forming mesogenic species having a first stable state exhibiting an optical axis perpendicular to it surface can be reversibly written on and erased by the process of the present invention. The process includes inducing birefringence with light of a first linear polarity perpendicular to the direction of the optical axis of the first stable state so that the film appears birefringent when viewed directly from above, followed by erasing the induced birefringence with light of a second linear polarity which is angularly offset with respect to the linear polarity of the beam used to write. Conversely, so long as the film is bistable and the first stable state is readily achievable from a second stable optical state wherein the film appears birefringent from above, the process could be initiated from the second stable state if so desired.

BRIEF DESCRIPTION OF DRAWINGS

The invention is described in detail below with reference to the figures wherein.

DETAILED DESCRIPTION

Figure 1:
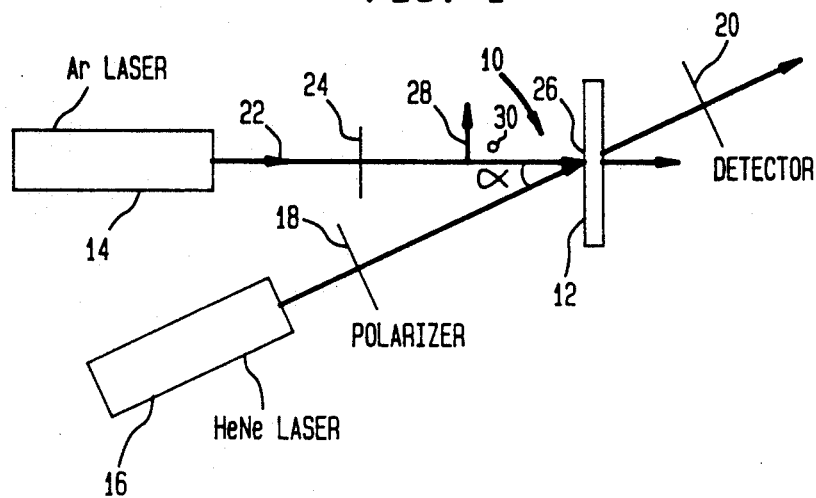
FIG. 1 is a schematic diagram of an apparatus used to write and erase an optical medium in accordance with the present invention and FIG. 2 shows the effect of repeated irradiation when the plane of polarization is not rotated.

The invention is described in detail hereinafter with numerous examples which are for illustrative purposes only. For instance, the present invention could be practiced using linearly polarized light which is offset by any appropriate angle, although 90 degrees has been found particularly effective and is thus described in detail herein.

Particularly preferred embodiments utilize multilayer optical films exhibiting an optical axis perpendicular to the film surface including a smectic-liquid crystal forming amphiphile and a nonionic water soluble polymer. The films are formed by preparing a solution followed by casting the solution into a film wherein the weight ratio of polymer to said smectic liquid crystal forming amphiphile is from a minimum ratio of about 2:7 to a maximum ratio of about 4:3; that is, from about 22 to about 60 weight percent polymer based on the combined weight of polymer and amphiphile.

Water soluble polymers which may be used include hydroxyalkylcellulose derivatives such as hydroxyethylcellulose or hydroxypropylcellulose. Other polymers such as polyvinylpyrrolidone, other clear film forming polymers and suitable mixtures thereof may be used. Generally speaking, this class of polymers is referred to as non-ionic water soluble polymers; however they may readily be dissolved with the amphiphiles in water/alcohol mixtures or other solvents which will dissolve both polymer and amphiphile in the desired concentration range. Particularly preferred molecular weights of the polymers are at least about 300,000 but even higher weights, 1,000,000 or so may in some circumstances be superior.

Smectic liquid crystal forming amphiphiles are most preferably of the azobenzene type described hereinafter, however, other smectic-forming molecules of the type known to form thermotropic or lyotropic smectic systems may also be employed. For example, a suitable amphiphile could be derived from 2-(p-pentylphenyl)-5-(p-pentyloxyphenyl) pyrimidine or an α-cephalin if so desired.

Films may be cast in a variety of methods in accordance with the present invention, however, methods involving mechanical stress such as knife-coating are preferred; spin coating are a particularly preferred method.

Thin film optical media especially useful in connection with the present invention include those comprising a self-assembled bilayer of an amphiphilic compound corresponding to the formula:

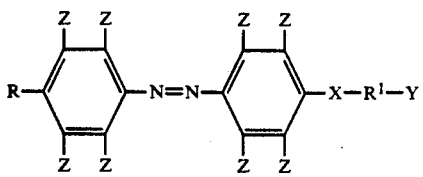

where R is an aliphatic substituent having a chain length of about 6–18 atoms; $R^1$ is a divalent aliphatic substituent having a chain length of about 2–12 atoms; X is a divalent electron-donating substituent; Y is a hydrophilic substituent; and each Z is independently hydrogen, alkyl, halogen, an electron donating or an electron-withdrawing substituent. Other amphiphiles may of course also be used as noted above; for example stilbene derivatives are likewise useful.

SYNTHESIS OF AZOBENZENE DERIVATIVES

In general azobenzene molecules useful in forming thin films with optical axis perpendicular to their surfaces may be synthesized as follows:

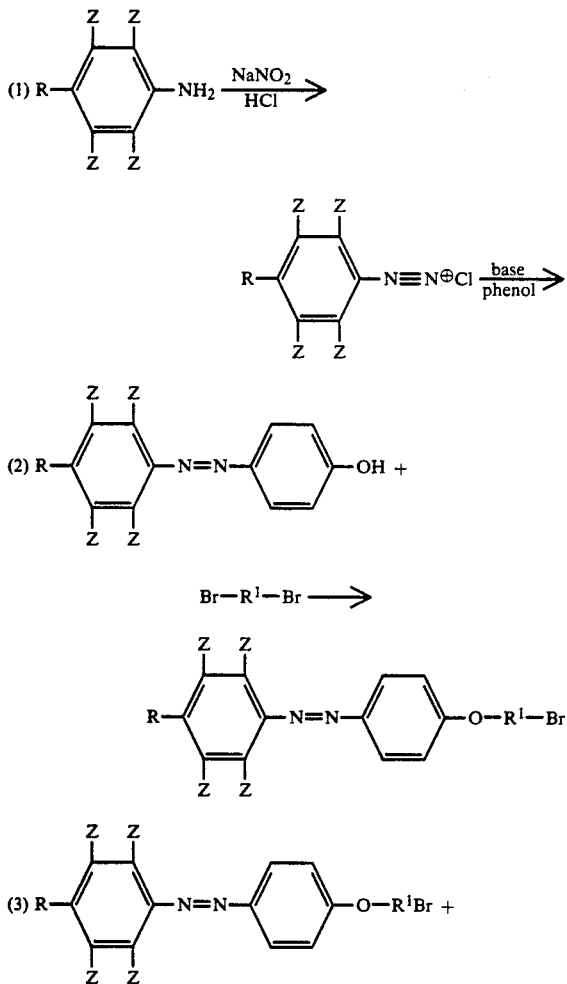

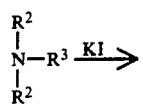

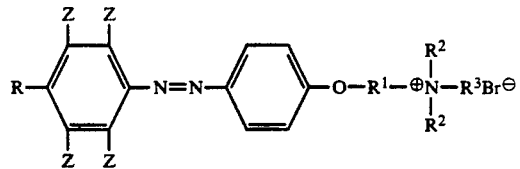

where $R_2$ and $R_3$ represent divalent organic groups and $R, R^1$ and Z are defined as above.

FILM FORMATION

An aqueous formulation of amphiphilic compound and nonionic water-soluble polymer is applied to a supporting substrate, and the applied coating is dried to form a thin film on the substrate surface. The aqueous formulation is preferably applied by conventional coating techniques involving mechanical stress such as spin-coating, knife-coating, or the like.

The supporting substrate can be any dimensionally stable material such as glass, silicon or plastic. The thickness of the thin film coating on the substrate can be varied in the range between about 0.1–50 microns. 0.1 to about 3 microns is believed the preferred range of thickness. The thin film can be stripped from the substrate surface in the form of an optically transparent film which is free-standing and self-supporting. Preferably, the substrate is hydrophilic.

During the coating and drying phases of the thin film formation procedure, the amphiphilic compound rearranges into self-assembled ordered bilayers, and the bilayers become incorporated into a laminated composite of strata of bilayers and water-soluble polymer. The drying can be performed under ambient conditions, or under ramped conditions with control of humidity an temperature utilizing a Tenney type chamber.

Another preferred present invention optical thin film medium is one in which the amphiphilic component of the composite consists of two or more different compounds corresponding generally to formula I. The presence of two or more amphiphiles appears to minimize unwanted crystallinity.

The following examples include examples which are further illustrative of optical media useful in connection with the process of the present invention. The components and specific ingredients are presented as being typical, and various modifications can be derived in view of the foregoing disclosure.

EXAMPLE I

This example illustrates the synthesis of 10-[-4[[4-dodecyl)phenyl]azo]phenoxy]-N-(2-hydroxyethyl)-N,N-dimethyl-1-decanaminium bromide.

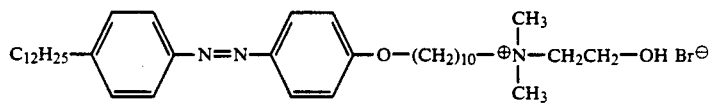

A. 4-dodecyl-4'-hydroxyazobenzene 4-dodecylaniline (50.0 g, 0.192 mol) was dissolved in acetone (400 ml) in a 2000 ml beaker. To the solution was added water (400 ml) and concentrated hydrochloric acid (80 ml), and a milky white suspension was formed. The stirring mixture was chilled to less than 10° C. in an ice-water bath.

In a separate procedure sodium nitrite (20.0 g, 0.290 mol) was dissolved in water (400 ml) and the solution was chilled to less than 10° C. The chilled sodium nitrite solution was added slowly to the aniline suspension while maintaining the temperature below 10° C. After the sodium nitrite addition was complete, the reaction mixture was a clear solution of the diazonium salt.

In a separate procedure a solution containing phenol (27.2 g, 0.289 mol), sodium hydroxide (12.0 g), sodium carbonate (48.0 g), in 800 ml water was prepared in a 2000 ml beaker. The solution of the diazonium salt was poured into the basic phenol solution, and an orange precipitate formed. The mixture was allowed to stir at room temperature for one hour. The pH was lowered from about 9.5 to about 4.5 by the addition of 45 ml of glacial acetic acid. The orange product was isolated by suction filtration and repeatedly washed with water. The crude product was dissolved in 1600 ml of acetone and then precipitated with 1500 ml of water. The orange precipitate was filtered by suction then dried at 40° C. in a forced air oven for 2 hours. The yield was 68.6 g, 97.9%.

TLC on a Merck grade 60 silica gel plate, with ethyl acetate eluent, gave two yellow spots. The major component had an $R_x$ of 0.685. The proton NMR spectrum was recorded for the product in $CDCl_3$ and indicated that the product was at least 98 mole percent pure.

B. 4-(10-bromodecyloxy)-4'-dodecylazobenzene

A 3000 ml three-necked round bottom flask was equipped with magnetic stirring, a heating mantle, a reflux condenser, and a nitrogen atmosphere. The flask was charged with 4-dodecyl-4,-hydroxyazobenzene (60.0 g, 0.164 mol), 1,10-dibromodecane, (66.95 g, 0.223 mol), potassium hydroxide (9.75 g, 0.174 mol), and ethanol (1260 ml). The stirring mixture was refluxed for seven hours. During the course of the reaction, a yellow precipitate formed in the reaction mixture. The reaction mixture then was cooled to room temperature and chilled in an ice-water bath. A crude product was isolated by suction filtration, washed with water, then with hexane. The product was recrystallized from ethyl acetate.

C. 10-[4-[[4-(dodecyl)phenyl]azo]phenoxy]-N-(2-hydroxyethyl)-N,N-dimethyl-1-decanaminium bromide A 3000 ml three-necked round bottom flask was equipped with magnetic stirring, a heating mantle, a reflux condenser, and a nitrogen atmosphere. The flask was charged with 4-(10-bromodecyloxy)-4'-dodecylazobenzene (40 g, 0.068 mol), dimethylethanolamine (95.2 g, 1.068 mole) and 1050 ml of tetrahydrofuran. The reaction mixture was allowed to reflux for 24 hours. During the course of the reaction mixture. After 24 hours, the reaction mixture was cooled to room temperature, and then chilled in an ice-water bath. The crystalline solid was isolated by suction filtration. The crude product was dissolved in hot methanol and filtered to remove insoluble impurities. The methanol was removed by evaporation at reduced pressure. The crude product was recrystallized from tetrahydrofuran. Yield 28.0 g, 61.0%.

EXAMPLE II

This example illustrates the production of an optical film from a self-assembled multiple amphiphilic bilayer.

0.8 g of the Example I azobenzene was added to 30 g of Millipore DI water and then sonicated with a Heat Systems—Ultrasonics Inc. sonicator model W-375 for 4 minutes using a 50% duty cycle and at an output control of 3. The solution was allowed to cool to room temperature, whereupon 0.4 g of hydroxypropylcellulose (HPC, average MW of 1,000,000, Scientific Polymer Products) was added. The solution was tumbled in a rotational tumbler for about 16 hours to dissolve the polymer. The solution then was filtered utilizing a Millipore pressure cell and a prefilter type AP 15-047-00 and a final filter type RA 1.2 μm, and a nitrogen pressure of 30 psi. At the end of the filtration the pressure was increased to 60 psi.

Glass and quartz substrates were cleaned with hot acetone followed by 50° C. 50% nitric acid cleaning, and then rinsed for 5 minutes under flowing Millipore DI water, and stored under water.

The substrates were spin-dried by spinning a 7850 rpm for 60 seconds on a Solitec spin coater located in a class 10 clean room. The substrate was next full flooded with the azobenzene HPC solution and spin coated for 120 seconds at rates of 450–2000 rpm. In all cases the spin coating resulted in smooth transparent films. The samples were placed in individual, covered petri dishes and then allowed to dry overnight at 19° C. and 40–60% RH. All films remained optically clear after drying.

Microscopic observation confirmed that the films remained dark upon rotation under crossed polarizers when viewed directly from above without any indication of crystalline or liquid crystalline phases. These observations are characteristic of a uniaxial film having an optical axis perpendicular to the film surface. Moreover, the films were uniform throughout.

EXAMPLE III

A series of films were spin coated from 5 w-% solutions containing azobenzene amphiphiles and HPC in a polymer to amphiphile ratio of 1:3. The solutions were prepared by first making 10 w-% solutions of the azobenzene amphiphiles with different ratios of A-1 and A-2 by sonication, then adding a calculated amount of HPC and tumbling the samples for about 16 hours. The clear viscous solutions were then diluted to 5 w-% by addition of water, and tumbled for another 2 hours. After filtration the solutions were spin coated onto clean glass substrates as described in Example II.

The viscosity of the solutions was determined with a Brookfield cone-plate micro viscometer. The film thicknesses were measured with a Dektak profilometer. The absorption maxima were determined by UV-Vis spectrometry, and the optical characteristics of the films were determined by means of orthoscopy and conoscopy before and after irradiation with UV light.

The experimental procedures and results are summarized in the following Table I.

The A-1 amphiphile is 10-[4-[[4-(dodecyl)phenyl]azo]phenoxy]-N-(2-hydroxyethyl)-N,N-dimethyl-1-decanaminium bromide, and the A-2 amphiphile is 6-[4-

[[4-(dodecyl)phenyl]azo]phenoxy]-N-(2-hydroxyethyl)-N,N-dimethyl-1-hexanaminium bromide.

Similar results are observed with the following type amphiphiles singly or in different combinations:

10-[4-[[4-(dodecyl)phenyl]azo]phenoxy ]-N-(2-hydroxyethyl)-N,N-dimethyl-1-decanaminium bromide (A-1 amphiphile)

6-[4-[[4-(dodecyl)phenyl]azo]phenoxy]-N-(2-hydroxyethyl)-N,N-dimethyl-1-hexanaminium bromide (A-2 amphiphile)

10-[4-[[4-(dodecyl)phenyl]azo]phenoxy]-N-(2-ethyl methacrylate)-N,N-dimethyl-1-decanaminium bromide (A-3 amphiphile) 10-[4-[[4-(dodecyl)phenyl]azo]phenoxy]-N-benzyl-N,N-dimethyl-1-decanaminium bromide (A-6 amphiphile)

Problems with solubility in water at room temperature were experienced with azo amphiphiles A-4, A-5 and A-7 which had to be spun from hot solutions and had a tendency to form crystalline impurities.

12-[4-[[4-(octadecyloxy)phenyl]azo]phenoxy]-N-(2-hydroxyethyl)-N,N-dimethyl-1-dodecanaminium bromide (A-4)

10-[4-[[4-(octyloxy)phenyl]azo]phenoxy]-N-(2-hydroxyethyl)-N,N-dimethyl-1-decanaminium bromide (A-5)

10-[4-[[4-dodecylphenyl]azo]phenoxyandecanoic acid sodium salt (A-7).

As can be seen, under the foregoing conditions, certain mixtures exhibit the necessary optical characteristics, while others do not exhibit an optical axis along a direction perpendicular to the film surface. Of course, all those films designated "ISOTROPIC" in table I have an optical axis perpendicular to the film surface in their as-spun state.

14, a Helium Neon laser 16, as well as a polarizer 18 and detector 20. Polarizer 18 and detector 20 are crossed polarizers which can detect birefringence in film 12 along the direction indicated by arrow 22 since the angle between the two lasers is small (five degrees or less typically).

Initially, since the film has an optical axis perpendicular to its surface (and $\alpha$ is a small angle) polarizer 18 and detector 20 do not transmit any light from laser 16, since one is viewing an isotropic medium between crossed polarizers in the direction of propogation. The HeNe laser has no effect on the medium since it is operated at low power and has a wavelength substantially longer than the absorption maxima of the film.

When, however, the film 12 was irradiated with light from Argon laser 14 ($\lambda = 350$ nanometers) through shutter 24 with a power of 100 milliwatts for 1/100 of a second birefringence was induced in film 12 at incident point 26. Under experimental conditions, the birefringent spot produced at 26 had a diameter of between one and two millimeters, roughly the diameter of the beam from laser 14. The birefringence is observed by virtue of the fact that polarizer 18 and detector 20 transmitted light from laser 16. If laser 14 was operated much longer than about 1/5 of a second, the birefringence tended to disappear.

The light from laser 14 was linearly polarized in the direction indicated by arrow 28 in FIG. 1 while the birefringence was being induced as described above. After the birefringence was induced, laser 14 was rotated 90 degrees so that the incident light beam was linearly polarized—in the direction indicated at 30, that is, perpendicular to the plane of the drawing. Rotation of the linear polarization could likewise be accom-

TABLE I

| A1/A2 Ratio | Viscosity CPS | Spin RPM/secs | Film Thickness $\mu m$ | UV-VIS nm | Orthoscopic Observation Along a Direction Perpendicular to the Film Surface |
|---|---|---|---|---|---|
| 5-W-% Solution of Azobenzene Amphiphiles And Hydroxypropyl Cellulose (M.W. 1,000,000) in a 75/25 Weight Ratio | | | | | |
| 100/0 | 655 | 750/120 | 2.5 | 335 | BIREFRINGENT |
|  | 655 | 1000/120 | 2.0 | 325 | BIREFRINGENT |
|  | 655 | 2000/120 | 1.4 | 325 | BIREFRINGENT |
|  | 655 | 4000/120 | 0.6 | 325 | ISOTROPIC |
| 80/20 | 816 | 1000/120 | 1.9 | — | ISOTROPIC |
|  | 816 | 2000/120 | 1.1 | 330 | ISOTROPIC |
|  | 816 | 4000/120 | 0.6 | 330 | ISOTROPIC |
| 60/40 | 205 | 1000/120 | 0.4 | 330 | ISOTROPIC |
|  | 205 | 2000/120 | 0.2 | 330 | ISOTROPIC |
|  | 205 | 3000/120 | 0.1 | 330 | ISOTROPIC |
|  | 205 | 4000/120 | 0.1 | 330 | ISOTROPIC |
| 40/60 | 369 | 1000/120 | 0.9 | 338 | BIREFRINGENT |
|  | 369 | 2000/120 | 0.4 | 330 | ISOTROPIC |
|  | 369 | 4000/120 | 0.3 | 330 | ISOTROPIC |
| 20/80 | 410 | 1000/120 | 1.1 | — | BIREFRINGENT |
|  | 410 | 2000/120 | 0.7 | 345 | BIREFRINGENT |
|  | 410 | 4000/120 | 0.3 | 345 | BIREFRINGENT |
| 0/100 | 574 | 1000/120 | 1.7 | — | BIREFRINGENT |

EXAMPLE IV

This example illustrates the writing/erasing method of the present invention. A thin film optical medium having an optical axis perpendicular to the film surface was fabricated in accordance with Example 3. The film had a weight ratio of 66/33 A1/A2 chromophore and was about 25 by weight PVP, the remainder being the amphiphilic azobenzene molecules Film thickness was between about 1 and 2 microns.

The film indicated at 12 was placed in apparatus 10 as shown in FIG. 1. Apparatus 10 includes an Argon laser plished by using a half wave plate o similar device if so desired.

When irradiated with light from the same laser whose polarization had been rotated 90 degrees (from the first irradiation described above) for about 1/100 of a second, the induced birefringence along the direction indicated by arrow 22 was erased. Film 12 once again had an optical axis perpendicular to its surface and thus polarizer 18 and detector 20 no longer transmitted light from HeNe laser 16. It is important to note that the same power is used to write and erase the media.

EXAMPLE V

Figure 2:
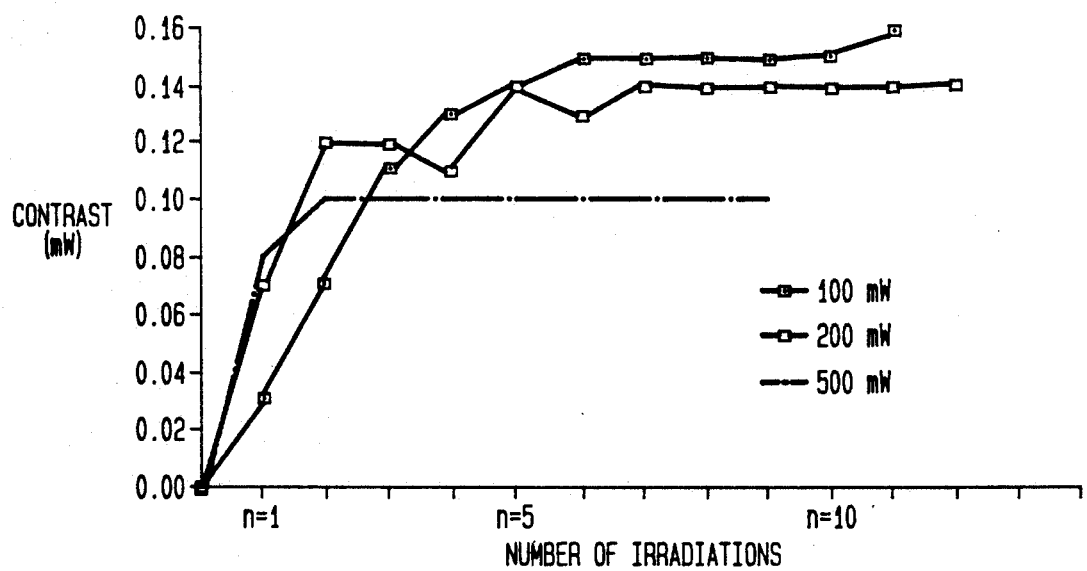

Following the procedure of Example IV, experiments were carried out on a number of films having optical axis perpendicular to their surfaces except that repeated irradiations for about 1/100 of a seconds without rotating the laser were performed. The results are shown in FIG. 2. The 1-2 millimeter diameter birefringent portions continued to become more birefringent upon repeated exposure.

We claim:

1. A method of optically recording and erasing information comprising:
   (a) irradiating a bistable film with light of a first linear polarity wherein said first linear polarity is substantially perpendicular to the surface of said film, said bistable film having in its initial state an optical axis perpendicular to the film surface, said irradiation being effective to induce birefringence along the direction of said optical axis in a portion of said film; and
   (b) irradiating said portion of said film with light of a second linear polarity wherein said second linear polarity is substantially perpendicular to the surface of said film, said second linear polarity being angularly offset with respect to said first linear polarity, wherein irradiating said portion with light of said second linear polarity is effective to return said portion to its initial state such that the optical axis of said portion is perpendicular to the film surface.

2. The method according to claim 1, wherein said second linear polarity is offset from said first linear polarity by an angle of 90 degrees.

3. The method according to claim 1, wherein said bistable film is formed by preparing a solution of a smectic liquid crystal forming amphiphile and a non-ionic water soluble polymer followed by casting said solution into a film wherein the weight ratio of said polymer to said amphiphile is from about 2 parts by weight polymer to 7 parts by weight amphiphile to about 4 parts by weight polymer to 3 parts by weight amphiphile.

4. The method according to claim 3, wherein said bistable film is substantially uniform throughout.

5. The method according to claim 4, wherein said bistable film is cast under mechanical stress.

6. The method according to claim 3, wherein said bistable film is cast from a water solution.

7. The method according to claim 3, wherein said bistable film is cast by spin-coating.

8. The method according to claim 3, wherein said water soluble polymer is selected from the group consisting of a hydroxyalkylcellulose polymer and polyvinylpyrrolidone and mixtures thereof.

9. The method according to claim 3, wherein said bistable film includes a mixture of amphiphiles including at least a first and at least a second species.

10. The method according to claim 3, wherein said bistable film is optically uniaxial in its initial state.

11. The method according to claim 3, wherein said water soluble polymer has a molecular weight of at least about 300,000.

12. The method according to claim 1, wherein said film has a thickness of about 0.1 to about 3 microns.

13. A method of optically recording and erasing information comprising:
   (a) irradiating a bistable film with light of a first linear polarity, said bistable film having in its initial state an optical axis perpendicular to the film surface, said irradiation being effective to induce birefringence along the direction of said optical axis in a portion of said film; and
   (b) irradiating said portion of said film with light of a second linear polarity, said second linear polarity being angularly offset with respect to said first linear polarity, wherein irradiating said portion with light of said second linear polarity is effective to return said portion to its initial state such that the optical axis of said portion is perpendicular to the film surface,
   wherein said bistable film is formed by preparing a solution of a smectic liquid crystal forming amphiphile and a non-ionic water soluble polymer followed by casting said solution into a film wherein the weight ratio of said polymer to said amphiphile is from about 2 parts by weight polymer to 7 parts by weight amphiphile to about 4 parts by weight polymer to 3 parts by weight amphiphile.

14. The method according to claim 13, wherein said bistable film is substantially uniform throughout.

15. The method according to claim 14, wherein said bistable film is cast under mechanical stress.

16. The method according to claim 13, wherein said bistable film is cast from a water solution.

17. The method according to claim 13, wherein said bistable film is cast by spin-coating.

* * * * *